(12) United States Patent
Min et al.

(10) Patent No.: US 11,256,101 B2
(45) Date of Patent: Feb. 22, 2022

(54) ELECTRONIC DEVICE

(71) Applicant: LG ELECTRONICS INC., Seoul (KR)

(72) Inventors: Dongog Min, Seoul (KR); Seungyong Shin, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 16/499,764

(22) PCT Filed: Aug. 19, 2019

(86) PCT No.: PCT/KR2019/010493
§ 371 (c)(1),
(2) Date: Sep. 30, 2019

(87) PCT Pub. No.: WO2021/033790
PCT Pub. Date: Feb. 25, 2021

(65) Prior Publication Data
US 2021/0333563 A1 Oct. 28, 2021

(51) Int. Cl.
*G02B 27/01* (2006.01)
*G06T 19/00* (2011.01)

(52) U.S. Cl.
CPC ..... *G02B 27/0176* (2013.01); *G02B 27/0172* (2013.01); *G02B 2027/0178* (2013.01); *G06T 19/006* (2013.01)

(58) Field of Classification Search
CPC .............. G02B 27/017; G02B 27/0172; G02B 27/0176; G02B 27/0178; G06T 19/006
See application file for complete search history.

(56) References Cited

U.S. PATENT DOCUMENTS

| | | | | |
|---|---|---|---|---|
| 2016/0330838 | A1* | 11/2016 | Park | G02F 1/133603 |
| 2018/0141499 | A1* | 5/2018 | Newman | B60R 11/0235 |
| 2019/0025645 | A1 | 1/2019 | Aieta | |

FOREIGN PATENT DOCUMENTS

| | | |
|---|---|---|
| JP | 2002277821 | 9/2002 |
| KR | 20180008796 | 1/2018 |
| KR | 101875313 | 7/2018 |
| KR | 101946947 | 2/2019 |

OTHER PUBLICATIONS

PCT International Application No. PCT/KR2019/010493, International Search Report dated May 19, 2020, 3 pages.

* cited by examiner

*Primary Examiner* — Amare Mengistu
*Assistant Examiner* — Cory A Almeida
(74) *Attorney, Agent, or Firm* — Lee, Hong, Degerman, Kang & Waimey PC

(57) ABSTRACT

An electronic device comprises: a display unit; a first unit positioned in front of the display unit and having a plurality of first pinholes; a second unit positioned between the display unit and the first unit and having a plurality of second pinholes; and an adjusting unit that adjusts the size of overlapping regions between the first pinholes and the second pinholes by changing the position of the second unit relative to the first unit.

20 Claims, 14 Drawing Sheets

ELECTRONIC DEVICE

CROSS-REFERENCE TO RELATED APPLICATIONS

This application is the National Stage filing under 35 U.S.C. 371 of International Application No. PCT/KR2019/010493, filed on Aug. 19, 2019, the contents of which are hereby incorporated by reference herein its entirety.

TECHNICAL FIELD

The present disclosure relates to an electronic device and, more particularly, to an electronic device used in virtual reality (VR), augmented reality (AR), mixed reality (MR), etc.

BACKGROUND ART

Virtual reality (VR) refers to a specific environment or situation, or technology itself that is similar to the real world but is not real, that is created by artificial technology using computers.

Augmented reality (AR) refers to a computer graphics technique that combines virtual objects or information into a real environment and makes them look like objects in the original environment.

Mixed reality (MR) or hybrid reality refers to the merging of real and virtual worlds to produce new environments and new information. In these environments, real-life objects and virtual objects co-exist and interact in real time.

The created virtual environment or situation stimulates the user's five senses and allows them to experience a spatial and temporal experience similar to the real world, freeing the boundaries between reality and imagination. In addition to being simply immersed in such an environment, users can interact with things implemented in such an environment, such as adding operations and commands using real devices.

Nowadays, research on gears used for these technologies is actively underway.

Of these gears, a head-mounted display (HD) conventionally uses a case made of an injection molded material, such as polycarbonate (PC) resin or acrylonitrile-butadiene-styrene (ABS) resin, coated with urethane.

Thus, an HMD with such a case poses an inconvenience to the user because the user cannot see outside world objects while wearing the HMD. F In this regard, conventional HMDs offer a function for capturing an image outside the device using a camera and showing the captured image to the user as a preview.

However, this method poses another inconvenience due to video distortion produced by the camera or due to image distortion caused by the difference with the actual size of the image.

DISCLOSURE

Technical Problem

Various aspects of the present disclosure are directed to providing an electronic device that allows a user to see the outside environment without distortion as selected by the user.

Technical Solution

An exemplary embodiment of the present disclosure provides an electronic device comprising: a display unit; a first unit positioned in front of the display unit and having a plurality of first pinholes; a second unit positioned between the display unit and the first unit and having a plurality of second pinholes; and an adjusting unit that adjusts the size of overlapping regions between the first pinholes and the second pinholes by changing the position of the second unit relative to the first unit.

According to the exemplary embodiment of the present disclosure, the second unit may be formed of a first pinhole plate or formed of a first pinhole plate and a second pinhole plate positioned to partially overlap each other.

In an example, if the second unit is formed of a first pinhole plate, the adjusting unit may comprise: a first wheel rotatably mounted to the first unit; and a serrated portion formed on the first pinhole plate and meshing with the first wheel.

In this case, when the first wheel is rotated clockwise or counterclockwise, the pinhole plate may move horizontally relative to the first unit.

The electronic device may further comprise a guide unit for guiding the horizontal movement of the first pinhole plate, wherein the guide unit may comprise: at least one guide pin fixed to a rear surface of the first unit; and at least one guide hole formed in the first pinhole plate and affixed to the at least one guide pin.

In another example, if the second unit may be formed of a first pinhole plate, the adjusting unit may comprise: a first wheel rotatably mounted to the first unit; a second wheel rotatably mounted to the first unit and meshing with the first wheel; and a serrated portion formed on the first pinhole plate and meshing with the second wheel.

In this case, when the first wheel is rotated clockwise or counterclockwise, the pinhole plate may rotate in the opposite direction to the direction the first wheel rotates, with respect to the center of the second wheel.

If the second unit is formed of a first pinhole plate and a second pinhole plate positioned to partially overlap each other, the adjusting unit may comprise: a first adjusting portion for adjusting the first pinhole plate; and a second adjusting portion for adjusting the second pinhole plate.

In this case, the first adjusting portion may comprise: a first wheel rotatably mounted to the first unit; and a first serrated portion formed on the first pinhole plate and meshing with the first wheel, and the second adjusting portion may comprise: a second wheel rotatably mounted to the first unit and meshing with the first wheel; and a second serrated portion formed on the second pinhole plate and meshing with the second wheel.

In this case, when the first wheel is rotated clockwise or counterclockwise, the first pinhole plate and the second pinhole plate may move horizontally in opposite directions with respect to the first unit.

The electronic device may further comprise a guide unit for guiding the horizontal movement of the first pinhole plate and second pinhole plate, wherein the guide unit may comprise: a plurality of guide pins fixed to a rear surface of the first unit; and a plurality of guide holes formed in the first pinhole plate and second pinhole plate and affixed to the plurality of guide pins.

The first serrated portion of the first pinhole plate and the second serrated portion of the second pinhole plate may have a height difference equal to the size of the second wheel.

The first pinhole plate and the second pinhole plate may share at least one of the plurality of guide pins.

An overlapping region between the first pinhole plate and the second pinhole plate may be made thinner than a non-overlapping region, and the sum of the thicknesses of the first pinhole plate and second pinhole plate in the overlapping region may be equal to the thickness in the non-overlapping region.

The first pinholes and the second pinholes may be either circular, elliptical, diamond, cruciform, or hexagonal in shape, or a combination thereof, and the first pinholes and the second pinholes may differ at least either in shape or size.

Advantageous Effects

An electronic device according to an exemplary embodiment of the present disclosure allows a user to see the outside environment without distortion as selected by the user by adjusting the size of overlapping regions between first pinholes and second pinholes.

That is, the user is able to view an image provided through a display unit of the electronic device when the size of the overlapping regions between the first pinholes and the second pinholes becomes zero.

Also, the user is able to see the outside environment without distortion through the overlapping regions between the first pinholes and the second pinholes when the size of the overlapping regions between the first pinholes and the second pinholes becomes anything other than zero.

Furthermore, the electronic device requires no camera for observing the outside environment, thereby reducing the manufacturing costs of the electronic device.

MODE FOR INVENTION

Figure 1:
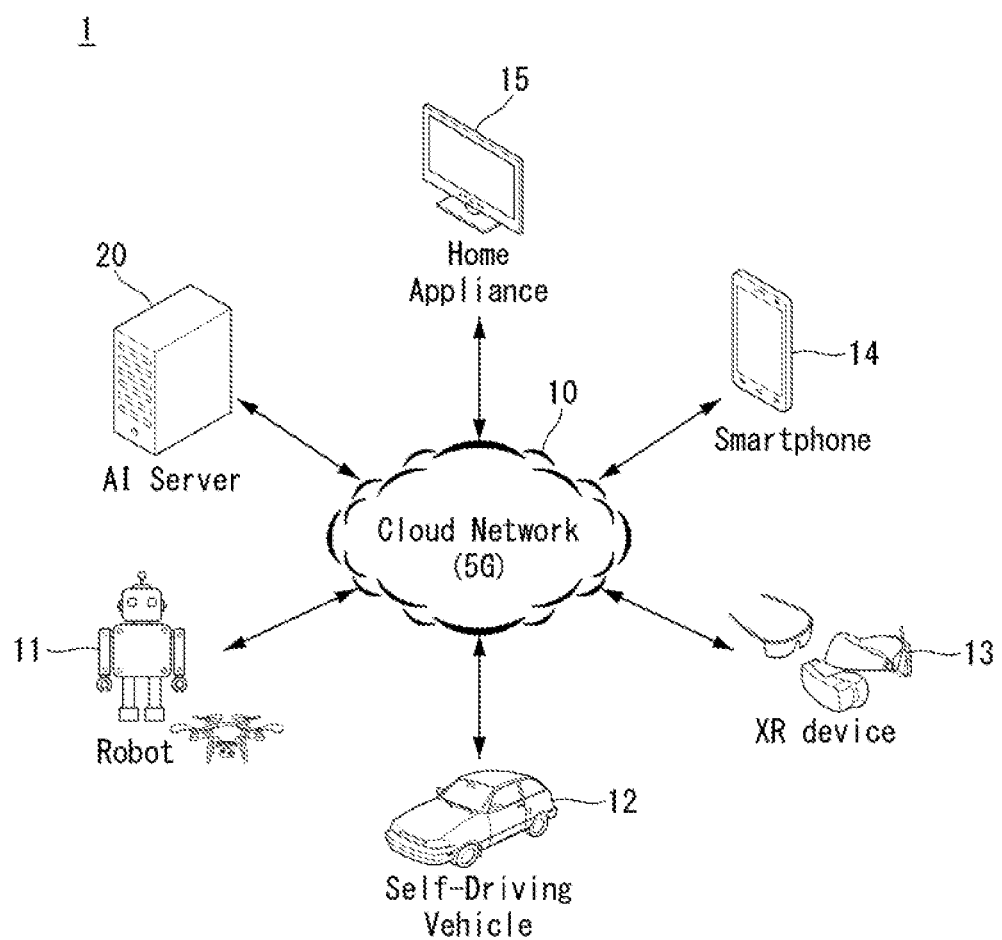
FIG. 1 illustrates one embodiment of an AI device.

Hereinafter, exemplary embodiments of the present disclosure will be described in detail with reference to the attached drawings. Throughout the specification, like reference numerals denote substantially like components. In describing the present disclosure, a detailed description of known functions or configurations related to the present disclosure will be omitted when it is deemed that they may unnecessarily obscure the subject matter of the present disclosure. In describing various exemplary embodiments, descriptions of the same or like components will be given in the beginning but omitted in other exemplary embodiments.

Although terms including ordinal numbers such as "first" and "second" may be used to describe various components, the components are not limited by the terms. The terms are used only to distinguish one component from other components.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment.

Data is one of core driving elements of the 5G system, which is so abundant that for the first time, the voice-only service may be disappeared.

In the 5G, voice is expected to be handled simply by an application program using a data connection provided by the communication system.

Primary causes of increased volume of traffic are increase of content size and increase of the number of applications requiring a high data transfer rate. Streaming service (audio and video), interactive video, and mobile Internet connection will be more heavily used as more and more devices are connected to the Internet.

These application programs require always-on connectivity to push real-time information and notifications to the user. Cloud-based storage and applications are growing rapidly in the mobile communication platforms, which may be applied to both of business and entertainment uses.

And the cloud-based storage is a special use case that drives growth of uplink data transfer rate. The 5G is also used for cloud-based remote works and requires a much shorter end-to-end latency to ensure excellent user experience when a tactile interface is used.

Entertainment, for example, cloud-based game and video streaming, is another core element that strengthens the requirement for mobile broadband capability. Entertainment is essential for smartphones and tablets in any place including a high mobility environment such as a train, car, and plane.

Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC.

Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second.

This fast speed is required not only for virtual reality and augmented reality but also for transferring video with a resolution more than 4K (6K, 8K or more).

VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles.

For example, entertainment for passengers requires high capacity and high mobile broadband at the same time. This is so because users continue to expect a high-quality connection irrespective of their location and moving speed. Another use case in the automotive field is an augmented reality dashboard.

The augmented reality dashboard overlays information, which is a perception result of an object in the dark and contains distance to the object and object motion, on what is seen through the front window.

In a future, a wireless module enables communication among vehicles, information exchange between a vehicle and supporting infrastructure, and information exchange among a vehicle and other connected devices (for example, devices carried by a pedestrian).

A safety system guides alternative courses of driving so that a driver may drive his or her vehicle more safely and to reduce the risk of accident.

The next step will be a remotely driven or self-driven vehicle. This step requires highly reliable and highly fast communication between different self-driving vehicles and between a self-driving vehicle and infrastructure.

In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes.

A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information.

Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance.

Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications.

However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10.

Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

Figure 2:
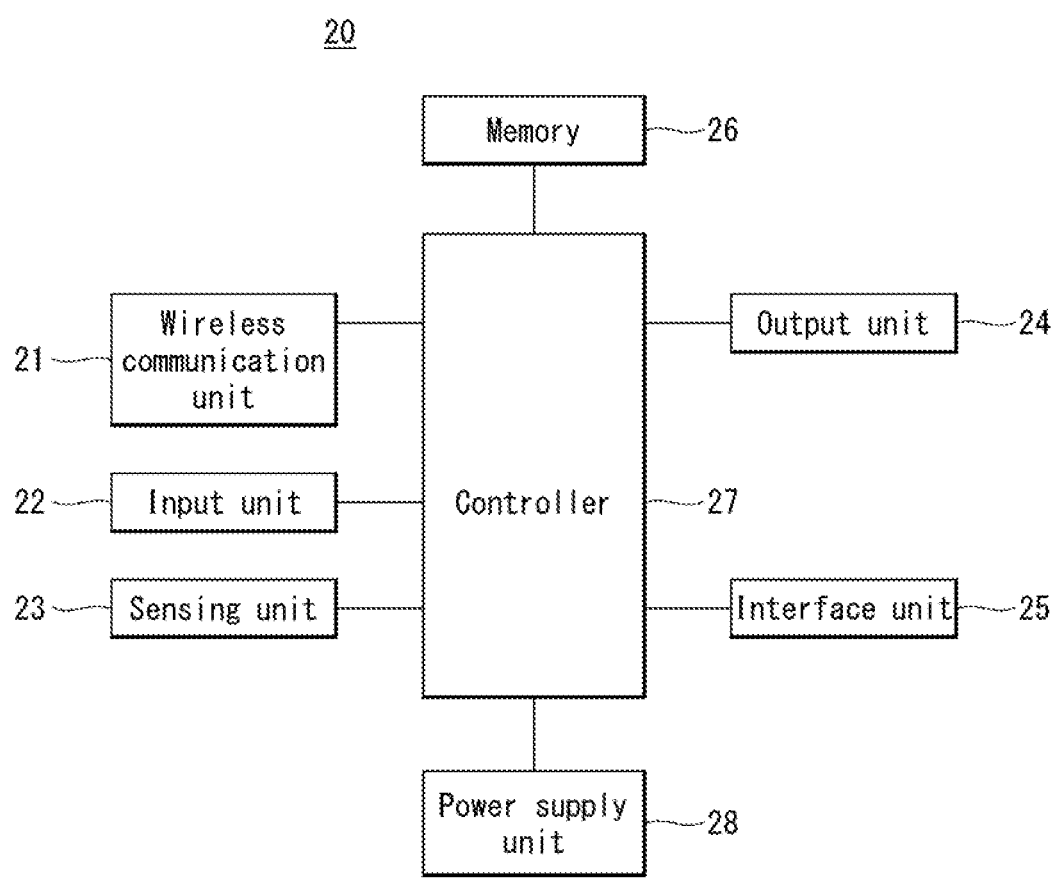
FIG. 2 is a block diagram illustrating the structure of an eXtended Reality (XR) electronic device according to one embodiment of the present disclosure.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28.

The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit.

The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20.

Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
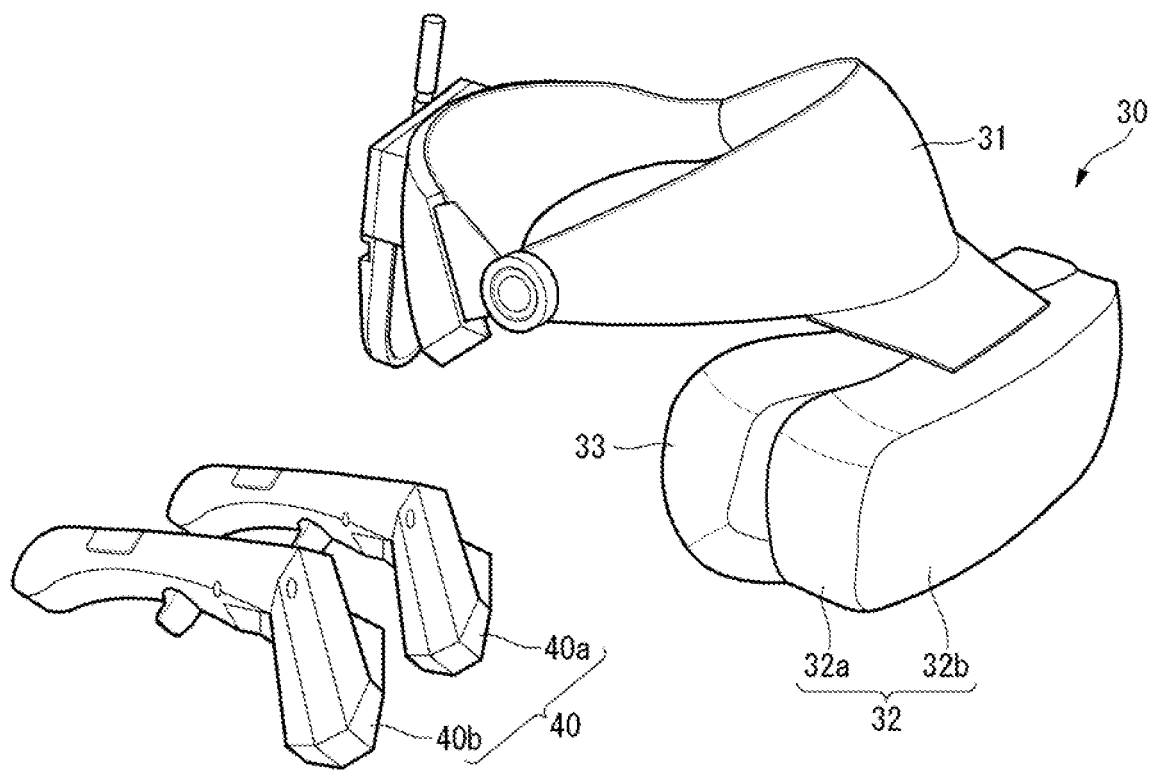
FIG. 3 is a perspective view of a VR electronic device according to one embodiment of the present disclosure.
Figure 4:
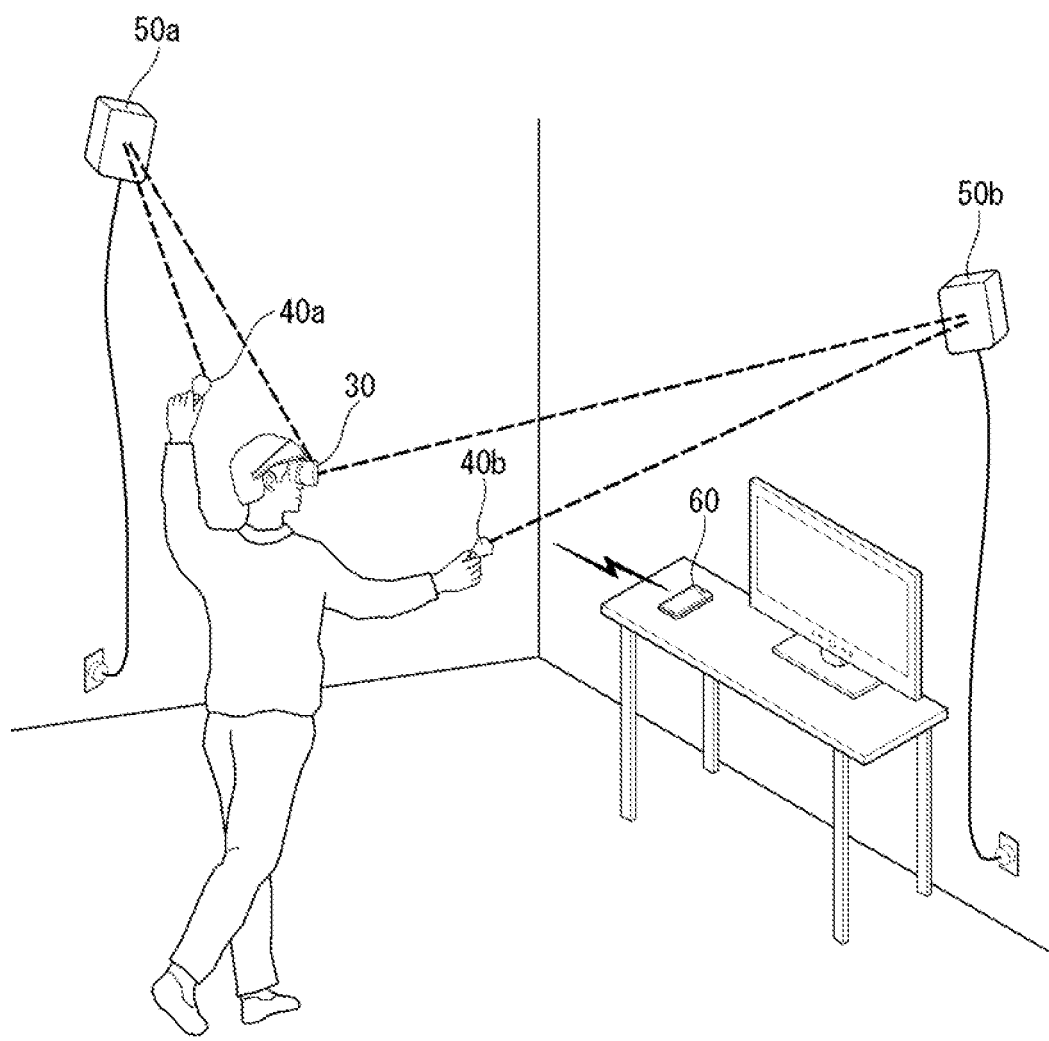
FIG. 4 illustrates a situation in which the VR electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40*a*, 40*b*) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32*a* combined with the head unit 31 and a display unit 32*b* containing a display panel.

The cover unit 32*a* is also called a goggle frame and may have the shape of a tub as a whole. The cover unit 32*a* has a space formed therein, and an opening is formed at the front surface of the cover unit, the position of which corresponds to the eyeballs of the user.

The display unit 32*b* is installed on the front surface frame of the cover unit 32*a* and disposed at the position corresponding to the eyes of the user to display screen information (image or video). The screen information output on the display unit 32*b* includes not only VR content but also external images collected through an image capture means such as a camera.

And VR content displayed on the display unit 32*b* may be the content stored in the electronic device 30 itself or the content stored in an external device 60.

For example, when the screen information is an image of the virtual world stored in the electronic device 30, the electronic device 30 may perform image processing and rendering to process the image of the virtual world and display image information generated from the image processing and rendering through the display unit 32*b*.

On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32*b*.

The display unit 32*b* may include a display panel installed at the front of the opening of the cover unit 32*a*, where the display panel may be an LCD or OLED panel. Similarly, the display unit 32*b* may be a display unit of a smartphone. In other words, the display unit 32*b* may have a specific structure in which a smartphone may be attached to or detached from the front of the cover unit 32*a*.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32*b*, or two or more of them may be installed at symmetric positions. When a plurality of image capture means are installed, a stereoscopic image may be obtained. An image combining an external image obtained from an image capture means with a virtual image may be displayed through the display unit 32*b*.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user.

And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40*a*, 40*b*) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32*b* in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50*a*, 50*b*) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
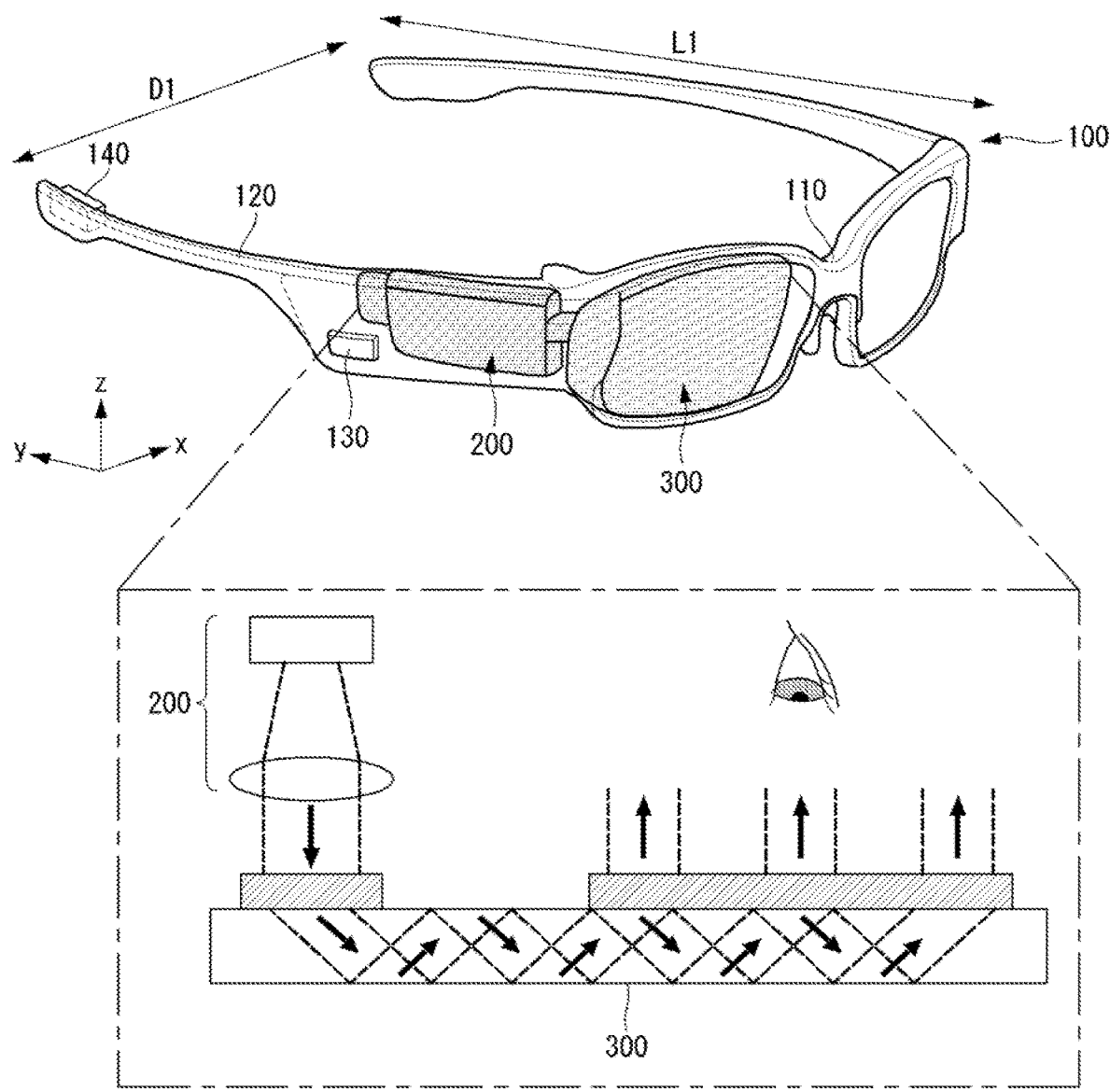
FIG. 5 is a perspective view of an AR electronic device according to one embodiment of the present disclosure.

FIG. 5 is a perspective view of an AR electronic device according to one embodiment of the present disclosure.

As shown in FIG. 5, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Figure 6:
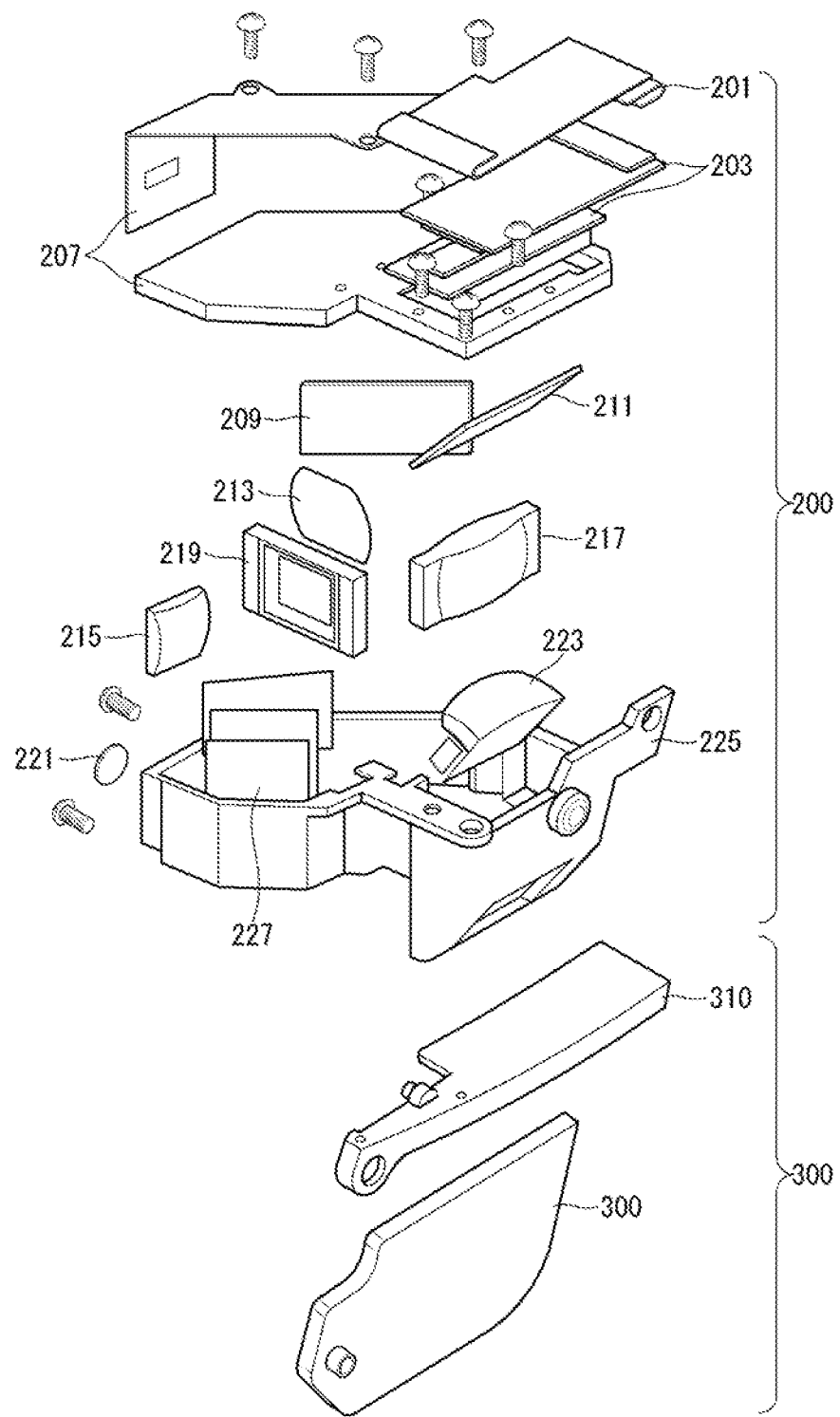
FIG. 6 is an exploded perspective view of a controller according to one embodiment of the present disclosure.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle.

Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization.

The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

Hereinafter, an electronic device according to the present disclosure will be described.

The electronic device according to the present disclosure is characterized in that a plurality of pinholes are formed in the case or front cover of the electronic device, and a user wearing the electronic device can see the outside environment through the pinholes without distortion.

An electronic device according to a first exemplary embodiment of the present disclosure will be described below with reference to FIGS. 7 and 8.

Figure 7:
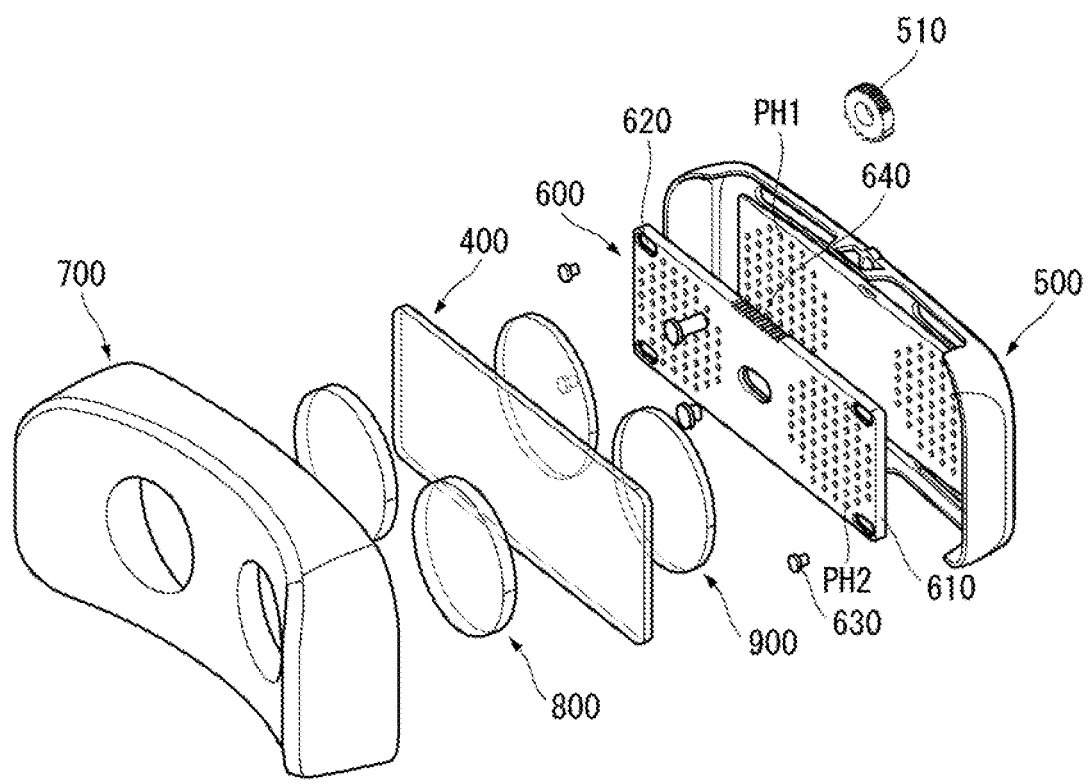
FIG. 7 is an exploded perspective view of an electronic device according to a first exemplary embodiment of the present disclosure.

FIG. 7 is an exploded perspective view of an electronic device according to a first exemplary embodiment of the present disclosure.

Figure 8:
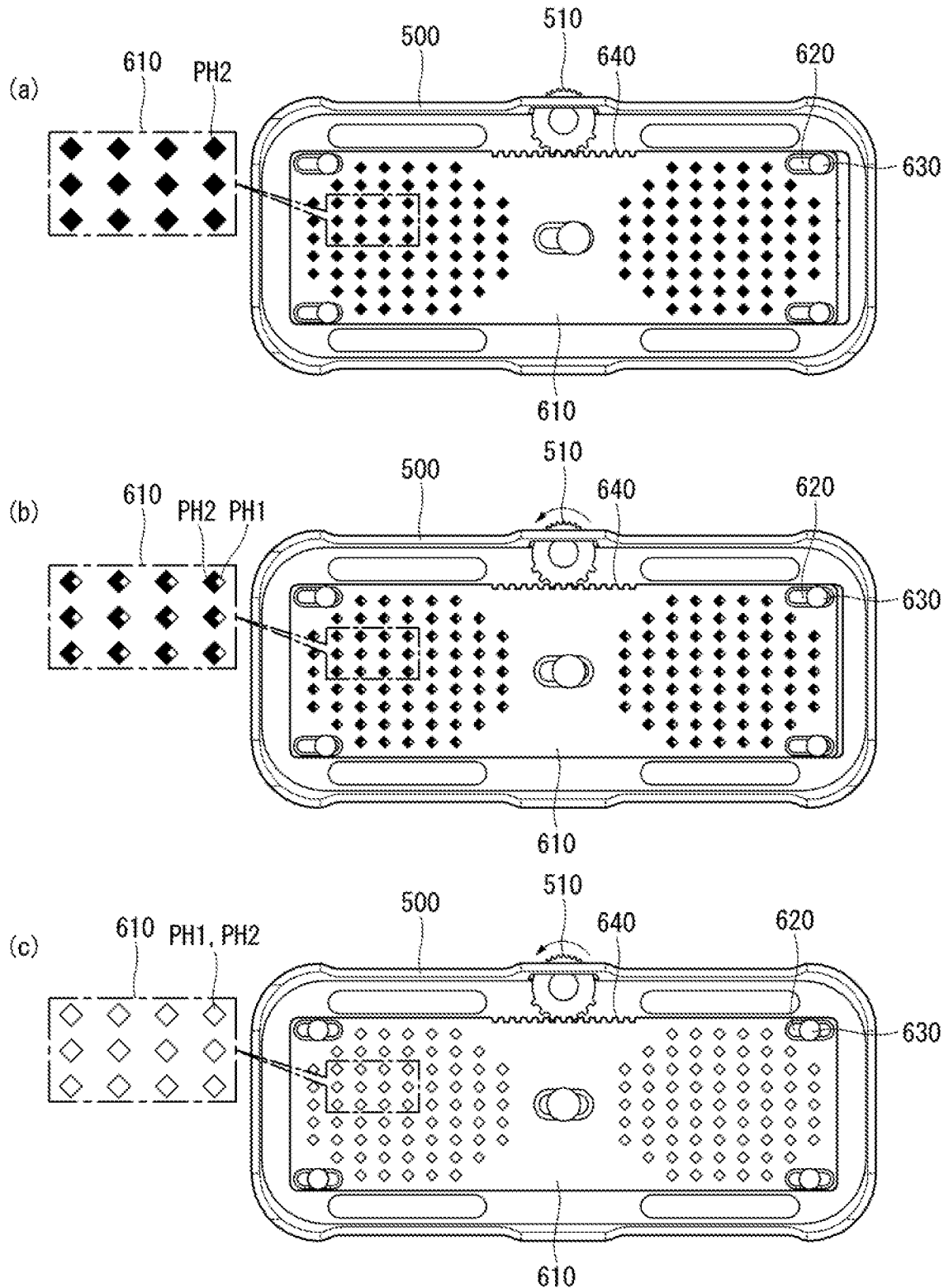
FIG. 8 is a rear view showing the electronic device shown in FIG. 7 when in a working state.

FIG. 8 is a rear view showing the electronic device shown in FIG. 7 when in a working state.

The electronic device according to the first exemplary embodiment of the present disclosure comprises a display unit 400, a first unit 500 positioned in front of the display unit 400, and a second unit 600 positioned between the display unit 400 and the first unit 500.

The electronic device may further comprise a face pad 700, fisheye lenses 800 positioned between the face pad 700 and the display unit 400, and counter lenses 900 positioned between the display unit 400 and the second unit 600.

Here, the counter lenses 900 are lenses for correcting distortions produced by the fisheye lenses 800, which also may be positioned between the second unit 600 and the first unit 500.

The display unit 400 may comprise a transparent display that displays video or image.

Thus, the user wearing the electronic device may see video or image reproduced on the transparent display of the display unit 400.

The first unit 500 may be a front frame of a case forming the exterior of the electronic device. Alternatively, the first unit 500 may be a front cover affixed to a side frame of the case.

A plurality of first pinholes PH1 are formed in the first unit 500. The first pinholes PH1 may be formed only in areas corresponding to the fisheye lenses 800 or across the entire area of the first unit 500.

In this exemplary embodiment, the second unit 600 is formed of a pinhole plate 610 with a plurality of second pinholes PH2, and is mounted on the first unit 500 so as to change its position relative to the first unit 500.

Specifically, the second unit 600 has at least one, preferably a plurality of, guide hole 620, and is fixed to the first unit 500 with at least one, preferably a plurality of, guide pins 630 affixed to the guide hole 620.

While FIG. 7 illustrates by way of example that the guide pins 630 are fastened to the guide holes 620 at the rear of the second unit 600, the guide pins 630 may be formed integrally with the first unit 500.

Although not shown, the guide pins 630 may be fixed to the first unit 500 if the guide pins 630 are fastened to the guide holes 620 at the rear of the second unit 600.

In order to allow the second unit 600 to move horizontally relative to the first unit 500, the guide holes 620 are formed longitudinally in a horizontal direction—for example, along the length of the second unit 600.

Here, the guide pins 600 and the guide holes 620 form a guide unit.

Thus, the second unit 600 may move horizontally relative to the first unit 500.

In order to allow the second unit 600 to move horizontally relative to the first unit 500, a serrated portion 640 is formed in at least some part of the top edge of the pinhole plate 610 of the second unit 600, and this serrated portion 640 meshes with a wheel 510 which is rotatably fixed to the first unit 500.

Here, the wheel 510 and the serrated portion 640 form an adjusting unit.

With this configuration, as shown in (a) of FIG. 8, when the second unit 600 is positioned at the center of the first unit 500, the overlapping regions between the second pinholes PH2 formed in the second unit 600 and the first pinholes PH1 formed in the first unit 500 get to their minimum size.

That is, the first pinholes PH1 and the second pinholes PH2 do not overlap at all.

As such, the user is not able to see the outside through the pinholes PH1 and PH2, but can view a video or screen reproduced on the transparent display.

In this instance, as shown in (b) of FIG. 8, when the wheel 510 is slightly rotated counterclockwise, the torque of the wheel 510 is transferred to the serrated portion 640 and the pinhole plate 610 of the second unit 600 moves to the right.

Accordingly, the second pinholes PH2 formed in the second unit 600 and the first pinholes PH1 formed in the first unit 500 partially overlap, thus enabling the user to see the outside environment through the overlapping regions between the first pinholes PH1 and the second pinholes PH2.

As shown in (b) of FIG. 8, when the wheel 510 is further rotated counterclockwise from the position, the torque of the wheel 510 is transferred to the serrated portion 640, causing the pinhole plate 610 of the second unit 600 to move further to the right. Thus, the overlapping regions between the second pinholes PH2 formed in the second unit 600 and the first pinholes PH1 formed in the first unit 500 get to their maximum size.

Therefore, the user is able to see the outside environment through the overlapping regions between the first pinholes PH1 and the second pinholes PH2.

While the foregoing description has been given of an example in which the first pinholes PH1 and the second pinholes PH2 overlap when the wheel 510 is rotated counterclockwise, it is possible to adjust the size of the overlapping regions between the first pinholes PH1 and the second pinholes PH2 even when the wheel 510 is rotated clockwise.

Also, when the second unit 600 moves horizontally relative to the first unit 500, the maximum moving distance of the second unit 600 is limited by interactions between the guide holes 620 and the guide pins 630.

The above first exemplary embodiment has been described with respect to an electronic device in which the second unit 600 moves horizontally relative to the first unit 500.

On the contrary, the second unit may rotate relative to the first unit. This will be described with reference to FIGS. 9 and 10.

Figure 9:
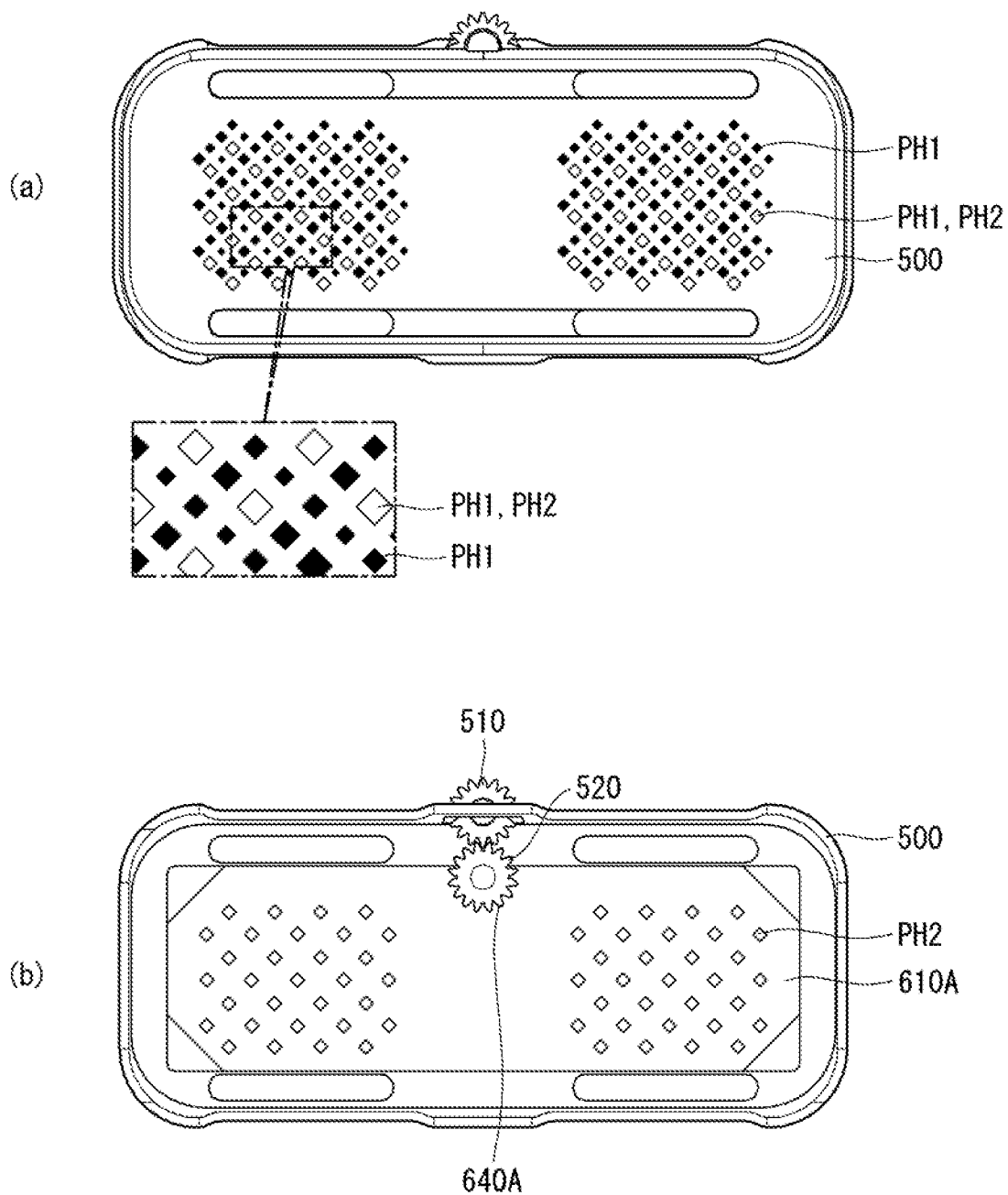
FIG. 9 is front and rear views showing main components of an electronic device according to a second exemplary embodiment of the present disclosure.

FIG. 9 is front and rear views showing main components of an electronic device according to a second exemplary embodiment of the present disclosure.

Figure 10:
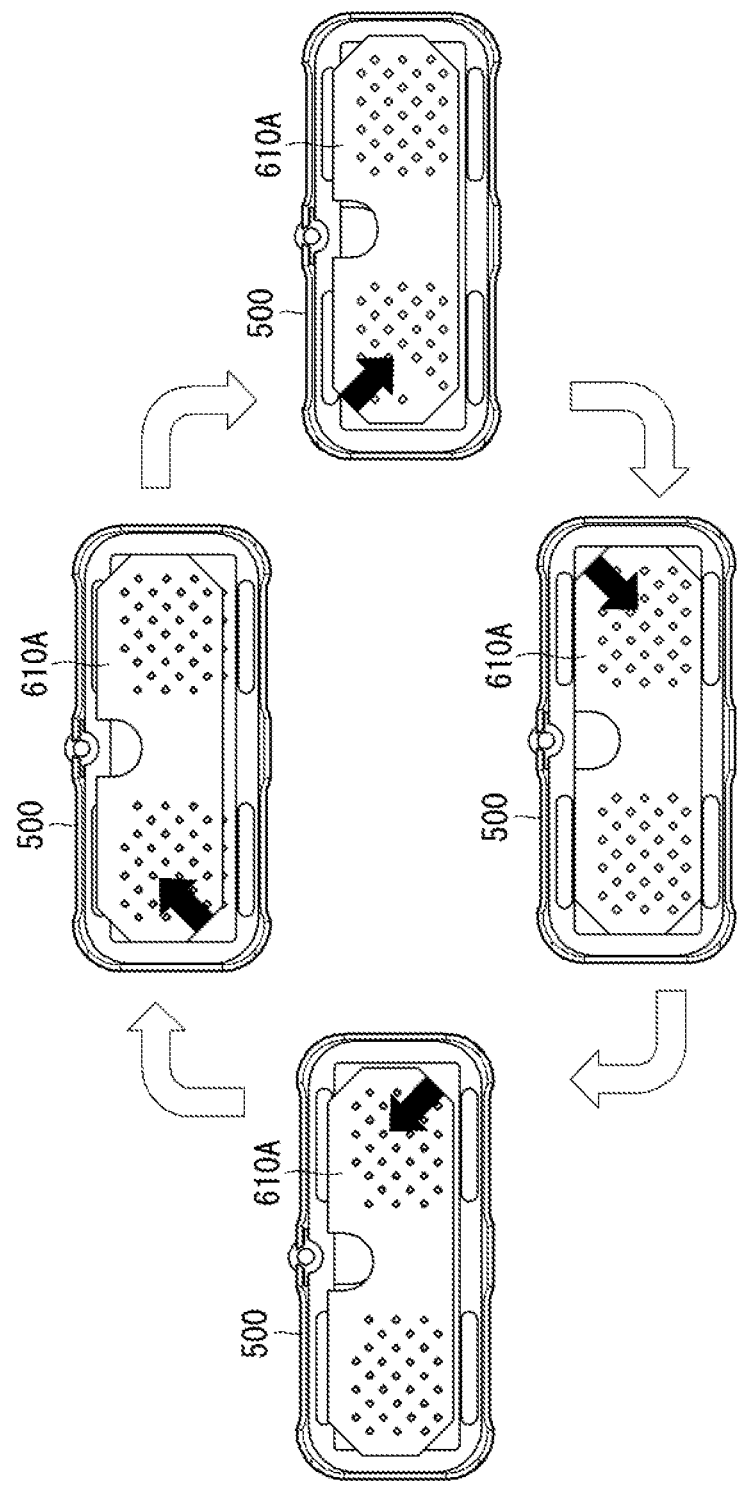
FIG. 10 is a rear view showing the electronic device shown in FIG. 9 when in a working state.

FIG. 10 is a rear view showing the electronic device shown in FIG. 9 when in a working state.

In describing the electronic device according to this exemplary embodiment, the same components as the electronic device of the foregoing first exemplary embodiment are assigned the same reference numerals, and a detailed description thereof will be omitted.

In the electronic device according to this exemplary embodiment, in order to allow a pinhole plate 610A of the second unit to rotate relative to the first unit 500, the adjusting unit of this exemplary embodiment may comprise a first wheel 510 rotatably mounted to the first unit 500, a second wheel 520 rotatably mounted to the first unit 500 and meshing with the first wheel 510, and a serrated portion 640A formed in the pinhole plate 610A and meshing with the second wheel 520.

In this case, the serrated portion 640A may have a roughly semicircular shape, unlike in the foregoing first exemplary embodiment.

Thus, when the first wheel 510 is rotated clockwise or counterclockwise, the pinhole plate 610A rotates in the opposite direction to the direction the first wheel 510 rotates, with respect to the center of the second wheel 520.

With this configuration, as shown in FIG. 10, the size of the overlapping regions between the first pinholes PH1 of the first unit 500 and the second pinholes PH2 of the second unit may be adjusted by changing the position of the pinhole plate 610A. Therefore, the user can see the outside environment as necessary, directly with their eyes without distortion.

Hereinafter, an electronic device according to a third exemplary embodiment of the present disclosure will be described with reference to FIGS. 11 to 13.

Figure 11:
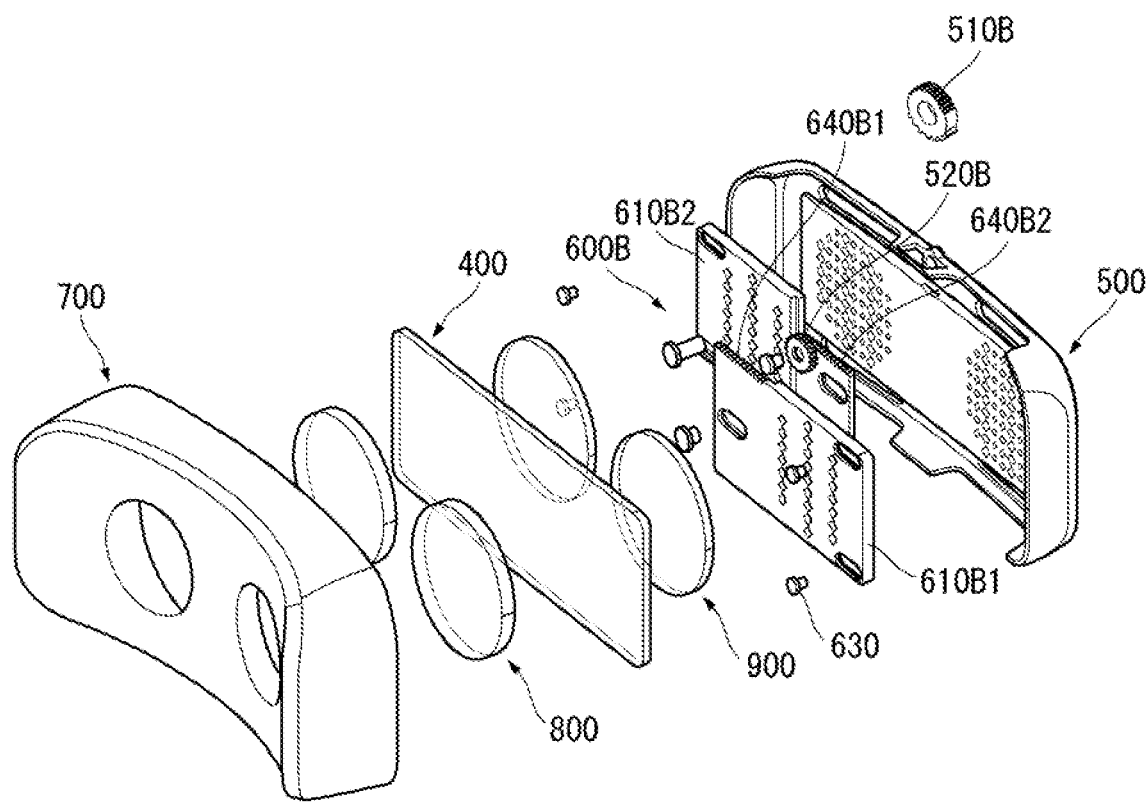
FIG. 11 is an exploded perspective view of an electronic device according to a third exemplary embodiment of the present disclosure.

FIG. 11 is an exploded perspective view of an electronic device according to a third exemplary embodiment of the present disclosure.

Figure 12:
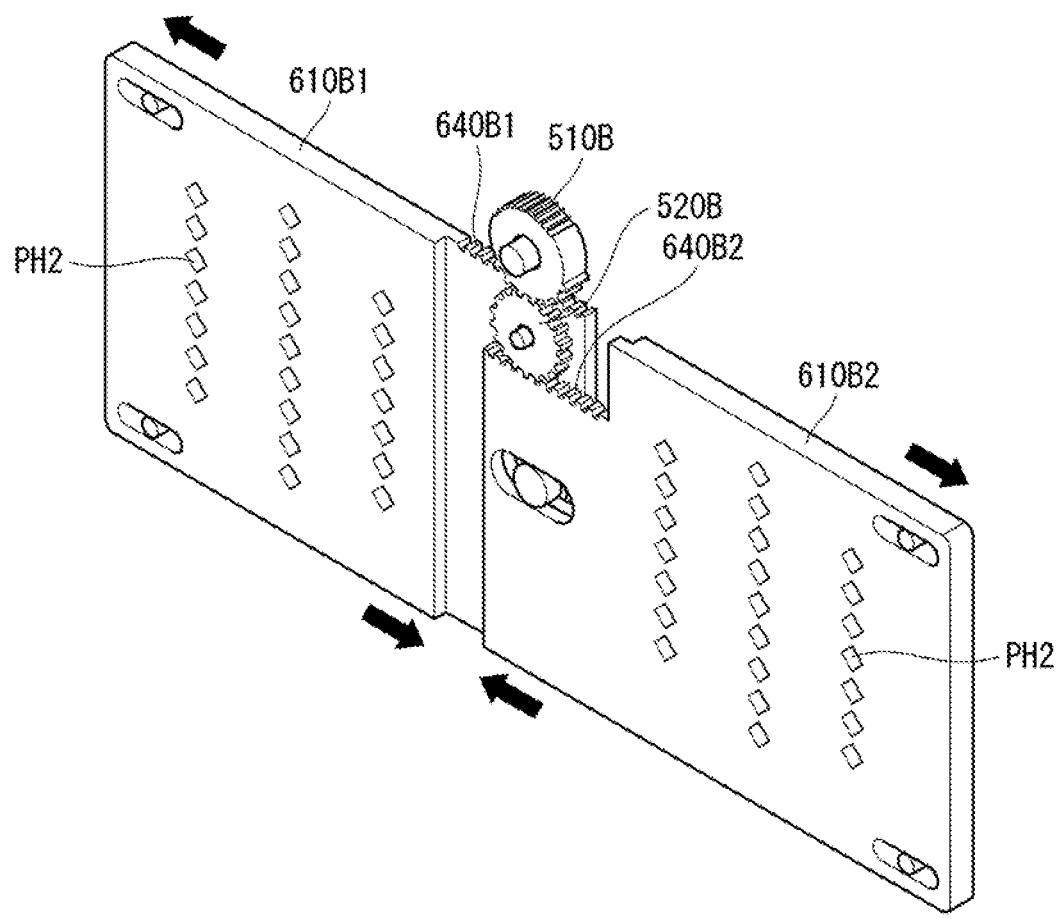
FIG. 12 is a perspective view showing a second unit and adjusting unit of the electronic device shown in FIG. 11 when in an assembled state.

FIG. 12 is a perspective view showing a second unit and adjusting unit of the electronic device shown in FIG. 11 when in an assembled state.

Figure 13:
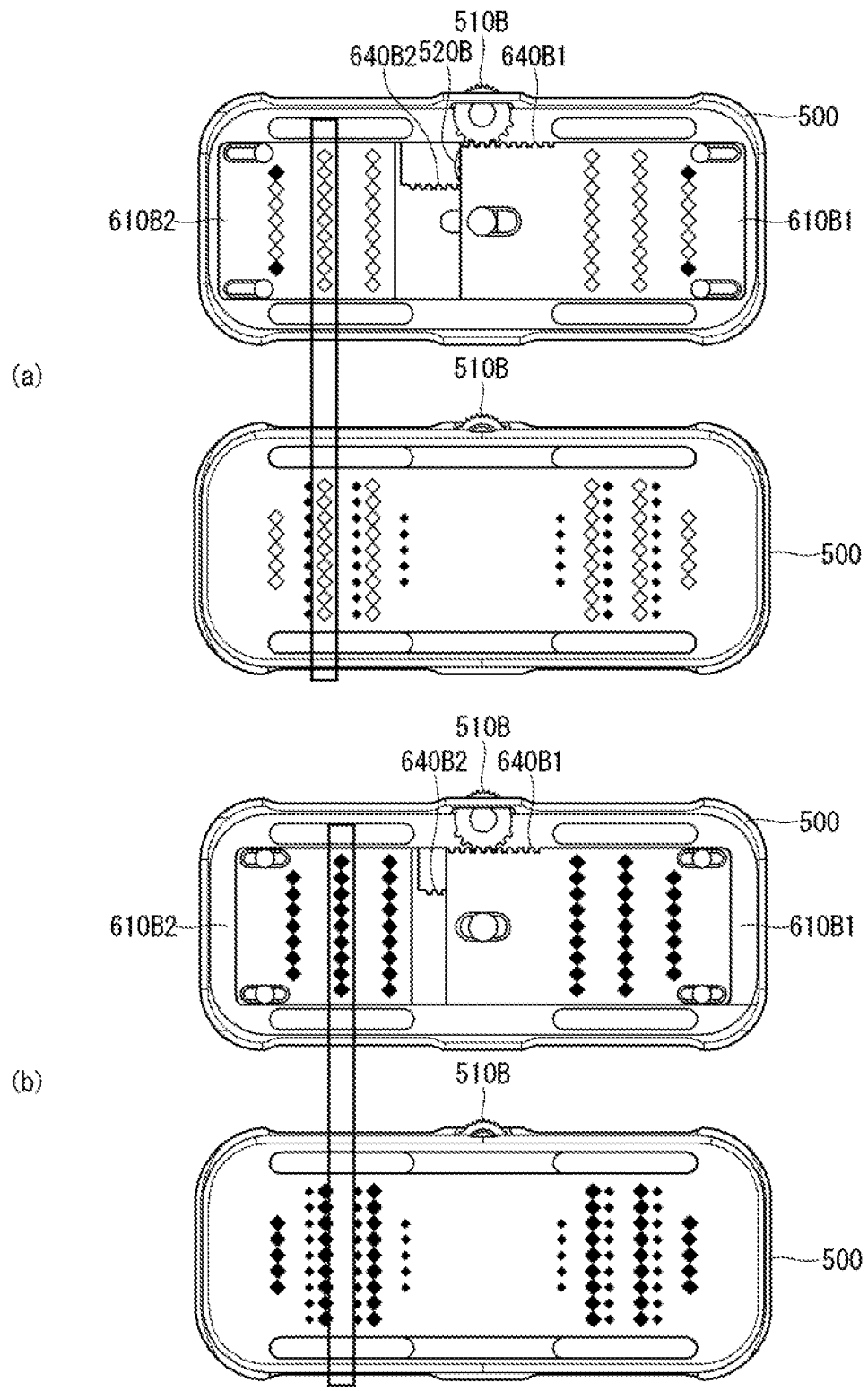
FIG. 13 is rear and front views showing the electronic device shown in FIG. 11 when in a working state.

FIG. 13 is rear and front views showing the electronic device shown in FIG. 11 when in a working state.

In describing the electronic device according to this exemplary embodiment, the same components as the electronic device of the foregoing first exemplary embodiment are assigned the same reference numerals, and a detailed description thereof will be omitted.

In the electronic devices according to the foregoing first and second exemplary embodiments, the second unit is formed of a single pinhole plate.

In contrast, in the electronic device according to this exemplary embodiment, the second unit 600B is formed of two pinhole plates—that is, a first pinhole plate 610B1 and a second pinhole plate 610B2.

The first pinhole plate 610B1 and the second pinhole plate 610B2 are positioned to partially overlap each other at the center of the first unit 500.

Since the second unit 600B in the electronic device according to this exemplary embodiment is formed of two pinhole plates 610B1 and 610B2 as described above, an adjusting unit for adjusting the positions of the pinhole plates 610B1 and 610B2 comprises a first adjusting portion for adjusting the first pinhole plate 610B1 and a second adjusting portion for adjusting the second pinhole plate 610B2.

In this case, the first adjusting portion comprises a first wheel 510B rotatably mounted to the first unit 500 and a first serrated portion 640B1 formed on the first pinhole plate 610B1 and meshing with the first wheel 510B, and the second adjusting portion comprises a second wheel 520B rotatably mounted to the first unit 500 and meshing with the first wheel 510B and a second serrated portion 640B2 formed on the second pinhole plate 610B2 and meshing with the second wheel 520B.

The second wheel 520B is mounted to reverse the direction of horizontal movement of the first pinhole plate 610B1 and second pinhole plate 610B2, and the first serrated portion 640B1 of the first pinhole plate 610B1 and the second serrated portion 640B2 of the second pinhole plate 610B2 have a height difference equal to the size of the second wheel 520B.

To eliminate any parallax difference between the left and right eyes, an overlapping region between the first pinhole plate 610B1 and the second pinhole plate 610B2 is made thinner than a non-overlapping region. The sum of the thicknesses of the first pinhole plate 610B1 and second pinhole plate 610B2 in the overlapping region is equal to the thickness in the non-overlapping region.

Moreover, the first pinhole plate 610B1 and the second pinhole plate 610B2 may share at least one of the plurality of guide pins 630—for example, the guide pin positioned at the center of the first unit 500.

According to the electronic device with this configuration, the torque of the first wheel 510B is transferred to the first pinhole plate 610B1 through the first serrated portion 640B1, and, at the same time, transferred to the second pinhole plate 610B2 through the second wheel 520B and the second serrated portion 640B2.

Thus, when the first wheel 510 is rotated clockwise or counterclockwise, the first pinhole plate 610B1 and the second pinhole plate 610B2 move horizontally in opposite directions, and therefore the first pinholes PH1 and the second pinholes PH2 overlap each other or do not overlap each other.

Figure 14:
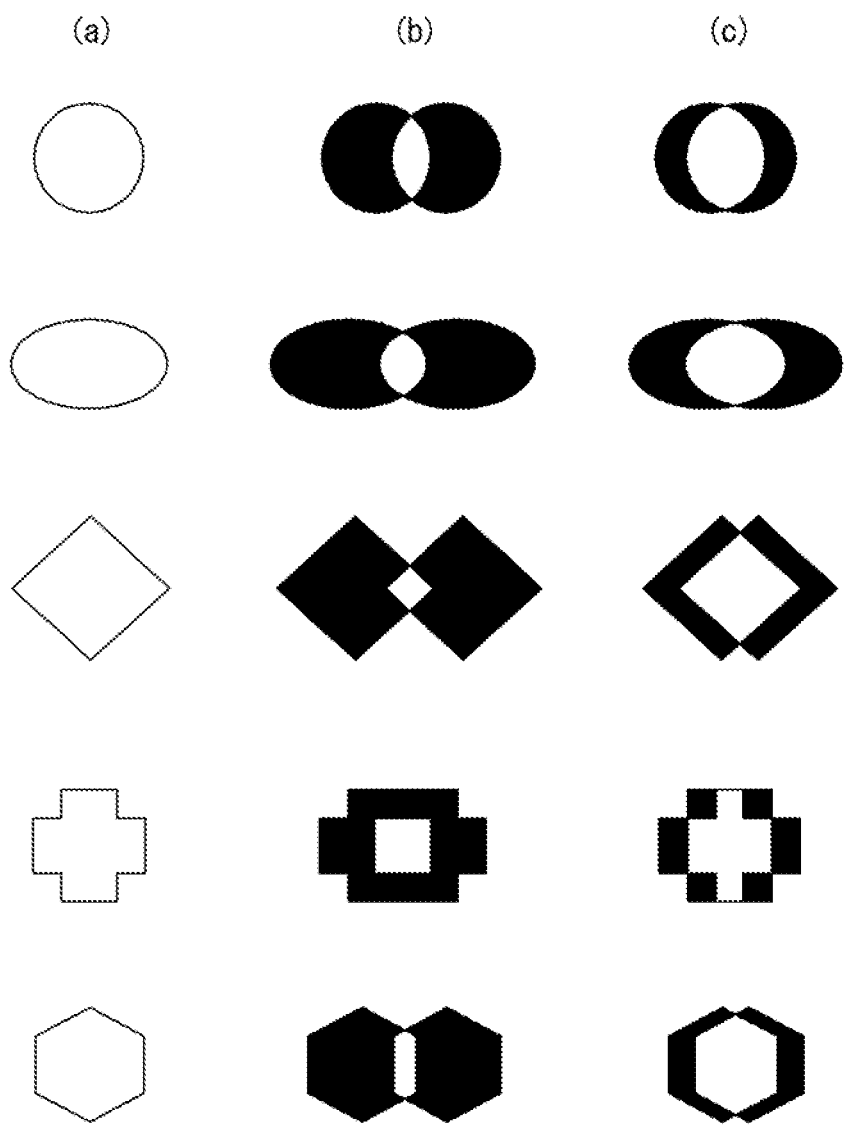
FIG. 14 is a view showing various shapes of pinholes provided in an electronic device according to an exemplary embodiment of the present disclosure.

Meanwhile, as shown in FIG. 14, the first pinholes PH1 formed in the first unit 500 and the second pinholes PH2 formed in the second unit 600 or 600B may have various shapes such as circular, elliptical, diamond, cruciform, and hexagonal.

(a) of FIG. 14 shows the first pinholes and second pinholes fully overlapping each other (first state), (b) of FIG. 14 shows the first pinholes and second pinholes partially overlapping each other (second state), and (c) of FIG. 14 shows the first pinholes and second pinholes overlapping each other more than in (b) (third state).

If the first pinholes PH1 and the second pinholes PH2 have a circular shape, they have a better field of view in the first state than other shapes.

If the first pinholes PH1 and the second pinholes PH2 have an elliptical shape, they maintain their original shape even in the third state.

If the first pinholes PH1 and the second pinholes PH2 have a diamond shape, they maintain the same shape to some degree, thus enabling continuous adjustment.

If the first pinholes PH1 and the second pinholes PH2 have a cruciform shape, they are consistent in shape to some degree since they have a rectangular shape in the second state, a cruciform shape in the third state, and a cruciform shape in the first state.

If the first pinholes PH1 and the second pinholes PH2 have a hexagonal shape, they maintain the same shape to some degree, thus enabling continuous adjustment.

Although not shown, the first pinholes PH1 and the second pinholes PH2 may have various polygonal shapes.

Meanwhile, the first pinholes PH1 and the second pinholes PH2 may be the same shape and size, or may differ at least either in shape or size.

Likewise, the pinholes formed in each unit may be the same shape and size, or may differ at least either in shape or size.

From the above description, those skilled in the art to which the present disclosure pertains will appreciate that various changes and modifications are possible without departing from the technical spirit of the present disclosure. Accordingly, the technical scope of this invention is not limited to what is described above, but rather defined by the appended claims.

What is claimed is:

1. A virtual reality (VR) or augmented reality (AR) display device comprising:
   a display unit;
   a first unit positioned in front of the display unit and having a plurality of first pinholes;
   a second unit positioned between the display unit and the first unit and having a plurality of second pinholes; and
   an adjusting unit that adjusts the size of overlapping regions between the first pinholes and the second pinholes by changing the position of the second unit relative to the first unit such that an outside environment is viewable or blocked.

2. The electronic device of claim 1, wherein the second unit is formed of a first pinhole plate.

3. The electronic device of claim 2, wherein the adjusting unit comprises:
a first wheel rotatably mounted to the first unit; and
a serrated portion formed on the first pinhole plate and meshing with the first wheel.

4. The electronic device of claim 3, wherein, when the first wheel is rotated clockwise or counterclockwise, the pinhole plate moves horizontally relative to the first unit.

5. The electronic device of claim 3, further comprising a guide unit for guiding the horizontal movement of the first pinhole plate.

6. The electronic device of claim 5, wherein the guide unit comprises:
at least one guide pin fixed to a rear surface of the first unit; and
at least one guide hole formed in the first pinhole plate and affixed to the at least one guide pin.

7. The electronic device of claim 2, wherein the adjusting unit comprises:
a first wheel rotatably mounted to the first unit;
a second wheel rotatably mounted to the first unit and meshing with the first wheel; and
a serrated portion formed on the first pinhole plate and meshing with the second wheel.

8. The electronic device of claim 7, wherein, when the first wheel is rotated clockwise or counterclockwise, the pinhole plate rotates in the opposite direction to the direction the first wheel rotates, with respect to the center of the second wheel.

9. The electronic device of claim 1, wherein the second unit is formed of a first pinhole plate and a second pinhole plate, and the first pinhole plate and the second pinhole plate are positioned to partially overlap each other.

10. The electronic device of claim 9, wherein the adjusting unit comprises:
a first adjusting portion for adjusting the first pinhole plate; and
a second adjusting portion for adjusting the second pinhole plate.

11. The electronic device of claim 10, wherein
the first adjusting portion comprises:
a first wheel rotatably mounted to the first unit; and
a first serrated portion formed on the first pinhole plate and meshing with the first wheel, and
the second adjusting portion comprises:
a second wheel rotatably mounted to the first unit and meshing with the first wheel; and
a second serrated portion formed on the second pinhole plate and meshing with the second wheel.

12. The electronic device of claim 11, wherein, when the first wheel is rotated clockwise or counterclockwise, the first pinhole plate and the second pinhole plate move horizontally in opposite directions with respect to the first unit.

13. The electronic device of claim 12, further comprising a guide unit for guiding the horizontal movement of the first pinhole plate and second pinhole plate.

14. The electronic device of claim 13, wherein the guide unit comprises:
a plurality of guide pins fixed to a rear surface of the first unit; and
a plurality of guide holes formed in the first pinhole plate and second pinhole plate and affixed to the plurality of guide pins.

15. The electronic device of claim 14, wherein the first serrated portion of the first pinhole plate and the second serrated portion of the second pinhole plate have a height difference equal to the size of the second wheel.

16. The electronic device of claim 15, wherein the first pinhole plate and the second pinhole plate share at least one of the plurality of guide pins.

17. The electronic device of claim 16, wherein an overlapping region between the first pinhole plate and the second pinhole plate is made thinner than a non-overlapping region.

18. The electronic device of claim 17, wherein the sum of the thicknesses of the first pinhole plate and second pinhole plate in the overlapping region is equal to the thickness in the non-overlapping region.

19. The electronic device of claim 1, wherein the first pinholes and the second pinholes are either circular, elliptical, diamond, cruciform, or hexagonal in shape, or a combination thereof.

20. The electronic device of claim 19, wherein the first pinholes and the second pinholes differ at least either in shape or size.

* * * * *